Figure 1:
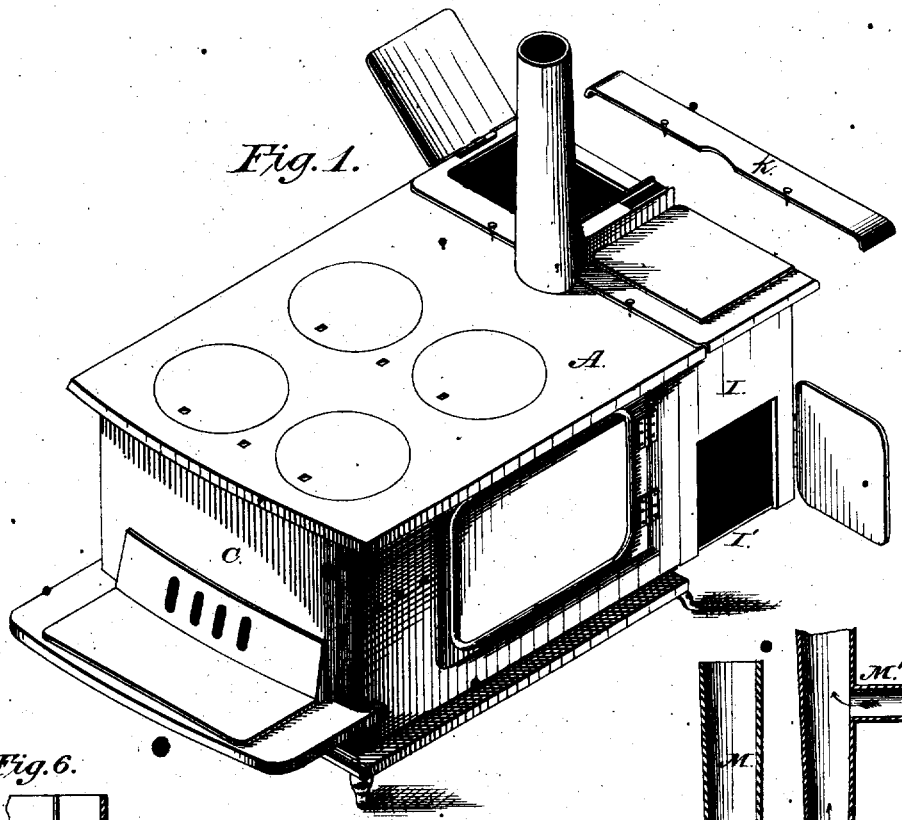
Figure 6:
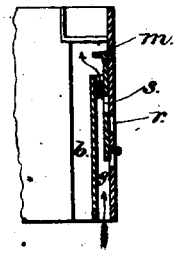

2 Sheets--Sheet 1.

J. R. HYDE.

Reservoir Cooking-Stove.

No. 6,390. Reissued April 20, 1875.

Attest:
John A. Ellis
W. M. Evans.

Inventor:
James R. Hyde
by J. D. Green atty

THE GRAPHIC CO. PHOTO.-LITH. 39 & 41 PARK PLACE, N.Y.

J. R. HYDE.

Reservoir Cooking-Stove.

No. 6,390. Reissued April 20, 1875.

Attest:
John A. Ellis
W. M. Crane.

Inventor:
James R. Hyde
by J. D. Green atty

THE GRAPHIC CO. PHOTO-LITH. 39 & 41 PARK PLACE, N.Y.

UNITED STATES PATENT OFFICE.

JAMES R. HYDE, OF TROY, NEW YORK.

IMPROVEMENT IN RESERVOIR COOKING-STOVES.

Specification forming part of Letters Patent No. 136,730, dated March 11, 1873; reissue No. 6,390, dated April 20, 1875; application filed March 17, 1875.

*To all whom it may concern:*

Be it known that I, JAMES R. HYDE, of the city of Troy, in the county of Rensselaer and State of New York, have invented certain Improvements in Cooking-Stoves, Water-Reservoirs, and Warming-Closets, of which the following is a specification:

The nature of my invention consists in the constructing in a cooking-stove a heating-chamber on the side of the fire-box, between the front oven-plate and the back fire-plate, into which chamber the air from the room is admitted through an aperture at one side of the stove, and at the end of the fire-box, where it becomes highly heated, and passes therefrom down through a flue or flues (at the opposite end of said chamber from the aperture where said air is admitted) in front of the oven and in rear of the ash-pit, to and through a flue in the bottom plate of the stove, and under the oven, to the rear of the stove, and into a vertical flue in rear of the ascending and descending smoke-flues; thence upward and through a valved aperture in the back plate of the stove to and into a flue at the bottom of a reservoir, and along the bottom and up the back, and across the top of said reservoir to and into the smoke-pipe. This heated air may be let into the rear smoke-flue of the stove, below the top plate thereof, or may be let into the room through the aperture in the back plate (when the reservoir is not attached to such stove) by the use of the movable valve. It also consists in the construction and arrangement of flues in such a manner that the air that is heated in the chamber about the fire-box is utilized to impart additional heat to the oven, and to effectually heat the reservoir and warming-closet, and the room where such stove is situated. The current of heated air is effectually controlled or regulated by movable valves, as hereinafter more fully stated. It also consists in the construction and arrangement of a water-reservoir and warming-closet mounted together, so that it may be readily attached to or detached from such stove, when desired, without the use of screws or screw-bolts, and said stove is effective in all its parts for cooking, baking, and heating, either with or without the reservoir and warming-closet, (except their use,) all of which is hereinafter more fully described, reference being had to the drawings, and letters of reference marked thereon, making a part of this specification.

Figure 2:
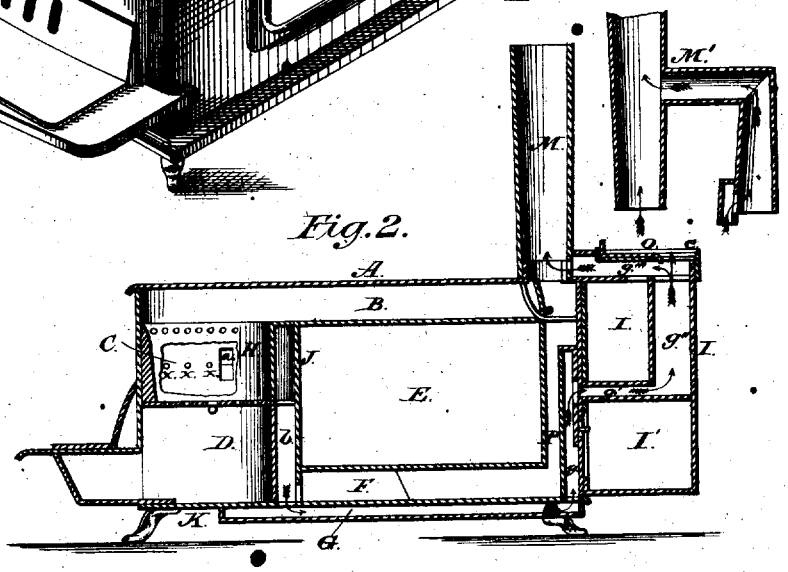
Figure 3:
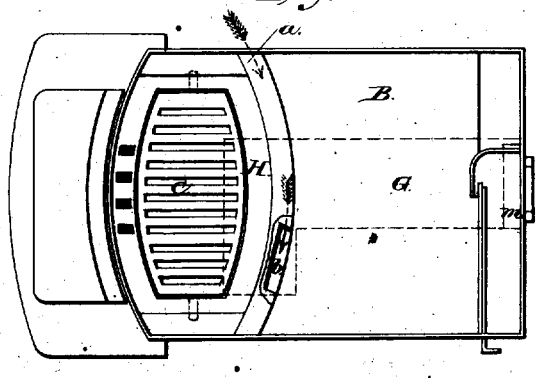
Figure 7:
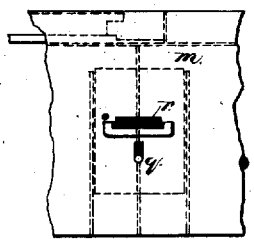
Figure 5:
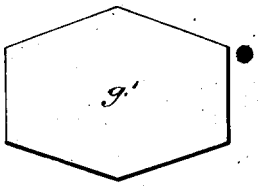
Figure 4:
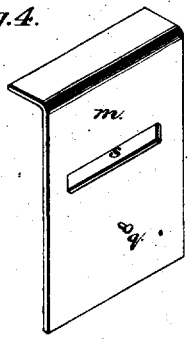

In the drawings, Figure 1 is a perspective view of my stove with a reservoir and warming-closet attached to its rear; also, a detached plate, *k*, used on the rear of the stove-top to make a finish when the reservoir is removed. Fig. 2 is a longitudinal vertical section, taken through the center of the stove; also, showing a detached view of a piece of stove-pipe, and top hot-air flue to the reservoir in a different form; also, a detached view of the damper or valves and flues in the rear of the stove in position to let the current of heated air into the smoke-flue when the reservoir is dispensed with. Fig. 3 is a plan view of the stove with the top plate A removed, showing the heating-chamber at the fire-box, the aperture or inlet *a*, flue *b*, and, by dotted lines, the flue G in the bottom plate of the stove; also, a detached view of a portion of the rear-end plate of the stove, showing the opening therein for the passage of heated air, and, by dotted lines, the inside vertical flue and valve *m*. Fig. 4 is a view of the damper or valve *m* used in the back vertical flue *g*. Fig. 5 shows the shape of the flue under the reservoir.

Like letters of reference indicate like parts in all the figures and drawings.

A represents the top plate of a cooking-stove, made in any of the known ways, except as hereinafter stated; B, the top oven-plate; C, the fire-box; D, the ash-pit; E, the oven; F, the common two or three flues under the oven; P, the common rear descending and ascending flues for smoke; I, a water-reservoir attached to the rear of said stove; I′, a warming-closet, located under the reservoir, and mounted therewith, forming but one piece. K is the bottom plate of the stove; G, the hot-air flue in the stove-bottom under the oven; M, the stove-pipe. There is a space or chamber at each end of the fire-box, into which air is admitted from the room, as at *x x*, Fig. 2. The air thus admitted becomes heated by the fire in the fire-box, and passes through small apertures at the inside edges of said chambers into the fire-box, as shown in Fig. 2, and mingles with the gases arising from combustion, and aids in burning such gas. There is a heating chamber or space between the back fire-plate H and the front oven-plate J. At one end of the fire-box there is an aperture, *a*, to admit cold air from the room into said heating-chamber, and at the opposite end of the fire-box from the aperture *a* is a flue, *b*, extending down in rear of the ash-pit D and in front of the oven, and connects with the flue G, which is sunk in the stove-bottom. This flue G extends to and connects with the vertical flue *g* at the rear end of the stove. This flue *g* is provided with a vertically-movable damper or valve, *m*, with its top end projecting over, so as to open or close the upper opening in said flue. In this valve *m* is an opening, *s*. (See Fig. 4.) There is also an opening, *r*, in the rear plate of the stove to correspond with the opening *s* in the valve *m*. There is a knob, *q*, that has a shank that passes through a slot in said back plate, and is fastened into said valve *m*, and by such knob said valve *m* is moved up and down, so that when said valve is moved upward the apertures *s* and *r* are closed, and the top end of the flue *g* is open, and the heated air will pass into the smoke-flue P of the stove, as shown in the detached drawing, Fig. 2; but when the valve *m* is moved downward the top of the flue *g* is closed, and the apertures *s* in the valve *m* and *r* in the back plate are opposite each other, so as to allow the outward passage of a current of heated air. The reservoir and warming-closet are mounted together, and form but one piece. The end jambs to said warming-closet and reservoir are cast or made whole or in one piece each. There is a horizontal flue, *g'*, under the bottom of the reservoir, which is spread out in its center, as shown in Fig. 5, so as to retain a larger amount of heat under said reservoir. This flue *g'* connects with the aperture *r* in the back plate of the stove, also with a vertical flue, *g''*, at the back of the reservoir, and said flue *g''* joins with a horizontal flue, *g'''*, on top of said reservoir, and which leads into the smoke-pipe M. These flues are for the passage of heated air—not smoke-flues. This top flue *g'''* has a slide-valve, *o*, on the top thereof, which covers an opening, *e*, so that by opening this valve *o* the current of heated air will be let into the room.

An opening may be made in the top of the reservoir, under the flue *g'''*, to carry the steam into the smoke-pipe M. This flue *g'''* is fastened to the top of the reservoir. The form of pipe M' may be used, if desired. The reservoir and warming-closet being all mounted together, forming but one piece, it is attachable and detachable at pleasure. The top plate of the reservoir projects forward, so as to rest upon the top plate A, and is held in position by iron pins or bolts without screws, (see Fig. 1,) and which pass into or through said top plate A. There is a stay-piece on each side of the stove, near the top, between which said reservoir is fitted. These may be dispensed with, if desired. The combined reservoir and warming-closet rests upon the stove-top, and is suspended at the rear of such stove, and is held in position by the iron pins or bolts and stay-pieces, without the employment of screws, screw-bolts, or hooks and eyes, so that it may be taken off or put on as readily as an ordinary boiler. No feet or legs are required. They would be only in the way, and make additional expense without benefit, and in all cases of moving or shipping it will be more cheaply and safely handled. The warming-closet may be dispensed with, if desired. When the stove is used without the reservoir, the plate *k*, as shown in Fig. 1, fits into the place of the reservoir-top, and makes a finish to the stove-top. Said piece may be fastened on by screws, if desired. The air admitted into the heating-chamber hereinbefore named becomes highly heated by the fire in the fire-box, and passes from such chamber down the flue *b*, in rear of the ash-pit, where it receives additional heat from said heated ash-pit and passes through the flue G to and into the vertical flue *g*, thence through the openings *s* in the damper and valve *m* and *r* in the back plate of the stove, into and along the flue *g'*, under the reservoir; thence up the back flue *g''*, into and along the flue *g'''*, and into the smoke-pipe M; or said current of heated air may be let into the room by opening the valve *o*, or, when the reservoir is detached from the stove, the current of heated air may be let into the room through the opening *r*, in the back plate, or into the smoke-flue of the stove at the top of the flue *g*. This stove may be used without the reservoir, and will be as effective in all its parts, except the use of such reservoir and warming-closet. It is well known that, in cooking-stoves, the front part of the oven becomes much hotter than the other parts thereof; but in my invention, with the heating-chamber and flue *b* in front, flue G under, and the vertical flue *g* in the rear of said oven, in addition to the ordinary revertible smoke-flues, all combine to provide additional heat, and to equalize the heat in the oven in all its parts; and further, by means of the additional heat obtained by the admission of air from the room into the heating-chamber, and the extra flues in the front, bottom, and back of said oven, and the flues around the reservoir, I am enabled to apply a water-reservoir, or reservoir and warming-closet, in the rear of the stove, and to heat the same more quickly and thoroughly than by any other device heretofore known, without in any manner interfering with the baking, roasting, or boiling, or with any of the culinary purposes for which a cooking-stove is designed. I am aware that reservoirs have been attached to cooking-stoves, and having smoke-flues through and about them in various ways, all of which are more or less objectionable on account of the accumulation of soot and ashes in and about such flues. They are especially objectionable on account of the corroding effects of the acids in the products of combustion which settle in and about such flues, and which are very destructive to the water-tank, and the outer portions of such flues and reservoir where such acids can reach them. When hot air only is used to heat such reservoir thin and softer metals may be used for tanks.

I do not claim a heating-chamber on one or more sides of a fire-box in a stove, or the admission of air from the room into such chamber, except in new combinations; but What I do claim as new, and for which I desire to secure Letters Patent, is—

1. The combination of the flues *b* and G, heating-chamber in rear of the fire-box, and the aperture *a* for the admission of air from the room into such heating chamber, substantially as and for the purposes described and set forth.

2. The combination of the flues *b* and G, with the vertical flue *g*, and the opening *r* in the back plate of the stove, substantially as and for the purposes described and set forth.

3. The combination of the vertical flue *g*, next the back plate of the stove, and having a valved opening at or near the top part thereof, with a valved opening *r*, in the back plate of said stove, for the purposes substantially as described.

4. The combination of the heating-chamber in front of the oven, and next the fire-box, the aperture *a*, with the flue *g*, opening *r* in the back plate, sliding damper or valve *m*, with the opening *s* therein, and having the top part of said damper projecting inward, to cover the top part of said flue *g*, substantially as and for the purposes described and set forth.

5. In combination, a stove having a water-reservoir attached thereto, which reservoir has hot-air flues, through which a current of heated air may pass from such stove, to and around said reservoir, and either into the smoke-flue or pipe of such stove, or through a valved opening at or near the top part of such reservoir, for the purposes substantially as described and set forth.

6. The combination of the heating-chamber at the fire-box, the flues *b*, G, and *g*, opening *r*, in the back-plate damper or valve *m*, with a water-reservoir, I, having the flues *g'* and *g''*, substantially as and for the purposes described.

7. The combination of the flues *g'*, *g''*, and *g'''*, with the valved opening *o*, and flue *g*, substantially as and for the purposes described and set forth.

8. The combination of the smoke-flues P and F, the hot-air flue *g*, opening *r* in the back plate of the stove, with a reservoir, I, having a flue on two or more sides thereof, through which may pass a current of heated air, substantially as and for the purposes described and set forth.

9. In combination, the water-reservoir I, and warming-closet I', arranged at the rear end of a cooking-stove, with the hot-air flue *g'* at the bottom of the reservoir, through which heated air may pass from such stove, substantially as and for the purposes described.

10. In combination, a water-reservoir and warming-closet for a cooking-stove, having hot-air flues through which may pass a current of heated air from such stove, said reservoir and warming-closet being mounted together, forming one article or whole, made capable of being attached to the top part or plate, and suspended at and against the rear end of such stove, or detached therefrom when desired, without the use of screws, screw-bolts, lugs, or hooks and eyes, substantially as and for the purposes described and set forth.

11. The combination of a water-reservoir, arranged at the rear part of a cooking-stove, which has a heating-chamber at the fire-box, into which air from the room may be admitted, and a duct (separate and distinct from the smoke-flue) through which to convey a current of air (heated in said chamber) to, into, and through a flue, under or about such reservoir, and into the smoke flue or pipe, substantially as and for the purposes described.

12. The combination of a cooking-stove with a water-reservoir attached thereto, which has a flue on two or more sides thereof, into and through which a current of heated air may pass from such stove to and through a valved opening, at or near the top part of such reservoir, into the room, substantially as and for the purposes described.

JAMES R. HYDE.

Witnesses:
IRVING W. ROSE,
CHARLES S. HYDE.